Figure 1:
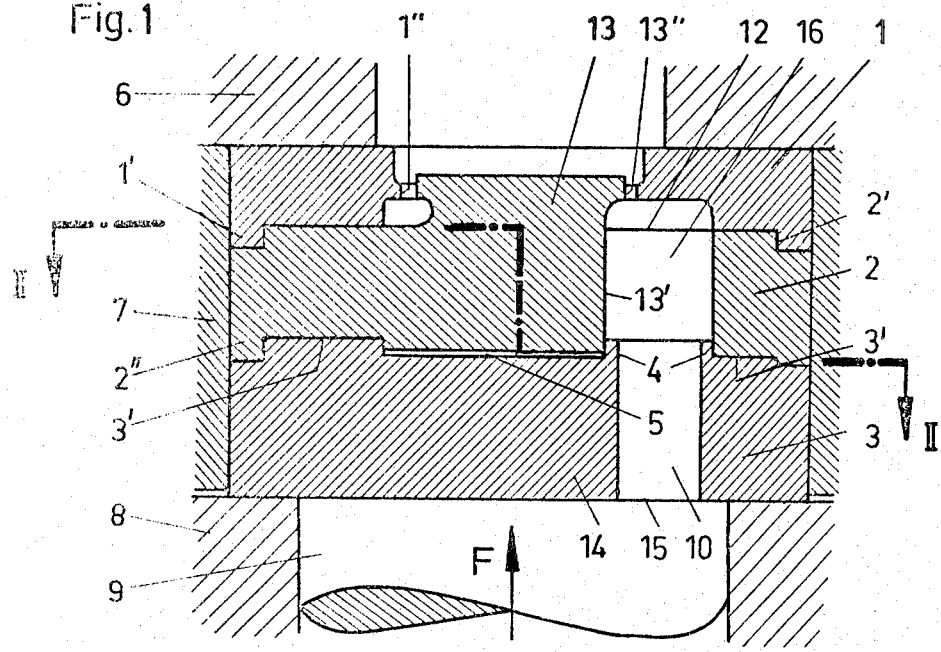

United States Patent

Kuske et al.

[11] 3,858,426
[45] Jan. 7, 1975

[54] EXTRUSION PRESS TOOL FOR THE PRODUCTION OF HOLLOW SECTIONS

[75] Inventors: Albrecht Kuske, Clausthal-Zellerfeld; Dieter Wanders, Massenhausen, both of Germany

[73] Assignee: Swiss Aluminum Ltd., Chippis, Switzerland

[22] Filed: July 19, 1973

[21] Appl. No.: 380,546

[30] Foreign Application Priority Data
Aug. 11, 1972 Germany.............................. 2239660

[52] U.S. Cl..................................... 72/269, 72/468
[51] Int. Cl............................................ B21c 25/04
[58] Field of Search ............... 72/268, 269, 468, 253

[56] References Cited
UNITED STATES PATENTS
2,741,363  4/1956  Billen................................. 72/468
2,887,224  5/1959  Stulen................................. 72/253
3,731,519  5/1973  Mahas................................ 72/468
3,748,885  7/1973  Creuzet.............................. 72/269

FOREIGN PATENTS OR APPLICATIONS
330,049  6/1930  Great Britain....................... 72/269

Primary Examiner—C. W. Lanham
Assistant Examiner—Robert M. Rogers
Attorney, Agent, or Firm—Ernest F. Marmorek

[57] ABSTRACT

Extrusion tool for the manufacture of hollow sections the said tool comprising a die cap with a bearing surface to form the outer contour of the hollow section and a core supported on the die cap or a one-piece core and die cap with at least one mandrel held by webs to form the inner contour of the hollow section, characterised in that a core shielding plate situated in front of the core in the direction of extrusion and provided with ports for the metal to be extruded, is separated by a stress relieving gap from the core at least at its area facing the mandrel.

15 Claims, 5 Drawing Figures

Patented Jan. 7, 1975

3,858,426

2 Sheets—Sheet 1

EXTRUSION PRESS TOOL FOR THE PRODUCTION OF HOLLOW SECTIONS

The invention concerns an extrusion press tool for the production of hollow sections the said tool comprising a die cap with a bearing surface to shape the outer contour of the hollow section and a core supported on the die cap or a one piece core and die cap with at least one mandrel held by webs to shape the inner contour of the hollow section.

Such tools can be made from a single piece as chamber type dies and as bridge type dies with a core separated from the die cap.

On extruding with such tools it is especially the core, forming the inner contour, which becomes so highly stressed that it frequently breaks after only a short time in service. The use of high strength materials does increase the lifetime of these tools. It was found however that by making use of such tools of first class materials the gain in life-time is not very great and that these tools also failed by fracture after a short time.

The applicant has determined that this is due above all to the high stressing of the mandrel or the mandrel supporting webs under conditions of tension and bending and is due in particular to the peak stresses which occur at the transition between web and mandrel. In service these peak stresses very often exceed the maximum permissible values so that premature fractures are unavoidable.

The object of the invention is to design the previously described extrusion tool so that the stressing of the core is reduced to a tolerable value.

The invention offers various solutions with this in view.

As a first solution for an extrusion tool of the type described earlier a core shielding plate with ports for the metal to be extruded is provided and is positioned in the direction of extrusion in front of the core, the area of the core shielding plate facing the mandrel being separated along the axis from the core by a stress relieving gap.

The core shielding plate thus bears the greater part of the force exerted by the blank, such as an extrusion billet, in the course of which the core shielding plate is able to bend freely over the breadth of the stress relieving gap. In this way the stress in the core is significantly reduced so that the peak stresses at the critical places can be kept below the permissible values in service. This leads to quite a considerable increase in the lifetime of the tool.

The decrease in stress in the core produces a corresponding decrease in deformation and, in particular a decrease in the bending of the core which results in a better dimensional accuracy being achieved in the extruded article.

The stress relieving gap is purposefully so dimensioned that also with the maximum bending of the core shielding plate under the force of the extrusion billet no contact occurs between the core and its shielding plate. A considerable reduction in stress, of the order of 20-25 percent, can even be achieved with a design in which the stress relieving gap is not sealed. This construction is usefully installed where several mandrels are set on one web. In this case however during the extrusion process metal from the billet enters the stress relieving gap and exerts on the core a pressure which is however certainly less than the extrusion pressure.

With regard to the reduction in stress an optimum version of the invention is one in which the stress relieving gap is sealed against the penetration of the extruded metal by means of an overlapping seal concentric to the mandrel and projecting from the core shielding plate.

In this way the greater part of the covered area of the core facing the billet to be extruded is completely relieved of the extrusion pressure by the core shielding plate so that a stress reduction of the order of 70 percent can be achieved.

At the same time the total dimension of the tool including the core shielding plate can be kept approximately the same alaong the axis as a tool without a core shielding plate.

Appropriately the loading on the core shielding plate is passed on through the die cap to the die support so that the core shielding plate is supported radially outside the ports by a collar on the core the collar being centred by means of a ring shaped flange.

A preferred practical version of the extrusion tool, in accordance with the first described solution, is characterized in that the ports in the core shielding plate are separated by webs, which the webs of the core cover, and have an inner radial boundary lying further out than the ports formed between the webs of the core.

This first solution of the invention is based on the general concept of removing as far as possible loading of the core during the extrusion of a billet.

In the following second solution the underlying concept is to design the core in such a practical way that in service a stress reduction is achieved at the highest stressed parts of the core and therefore at the transition between web and core on the downstream side.

In one version of the solution based on this priciple, the transition from web to mandrel neck exhibits at least one curve and comprises in cross section a sloping region of larger radius than the curve or is of infinite radius. The transition can have for example the shape of a tractrix with decreasing curvature up to the mandrel neck. In production however a simpler version may be one in which the transition is sloping. By practical measures of this kind a stress reduction of the order of 25 percent is achieved at the highest stressed transition between web and mandrel on the downstream side of the web.

An even greater stress reduction can be achieved if the web itself has about the same slope as the transition, and the support of the core on the die cap is set concentric to the mandrel. In a practical version making use of this a stress reduction of up to 50 percent can be achieved. Likewise the supports can be sloping or conical so that they form a continuation of the sloping part of the transition and of the under side of the web.

In a further refinement of the second principle a stress reduction can be achieved at the transition between web and mandrel of an extrusion tool, in which the mandrel in the region of the web is tapered, and the cross section of the mandrel therefore increases in the direction of the mandrel neck, allowing an increase in slope in the region of the transition.

Finally a stress reduction of the same order of magnitude by the second principle can be achieved by the web itself sloping in a corresponding way to the transition and the support of the core being set concentric to the mandrel.

Surprisingly a stress reduction resulted from a further version of an extrusion tool in which the mandrel is provided with one or more stress relieving notches e.g. with a blind hole produced from its exit end, the notch ending at about the level of the transition to the webs and whose base is rounded off.

A third solution is characterised in that in service the core is subjected to a radial pressure. This solution is based on the knowledge that the effective stress in the highest stressed transition area is essentially a tensile stress. The magnitude of this tensile stress can be reduced if a counteracting compressive stress is superimposed on it. This is preferably achieved by the outside contour of the core being conical and the core being fitted into a corresponding conical inner surface of the tool whereby the conical surfaces are tapered in the extrusion direction and the core angle $2\alpha$ of the core outer contour is given by the relationship.

$$\tan 2\alpha = \frac{B_{K,\,d}}{B_{k,\,b}} \cdot \frac{Hm^2}{6H} \cdot C \cdot \frac{1}{\left(\frac{L_s}{2} - a\right)\left(1 - \frac{L_s - 2a}{2L_s}\right)}$$

where $B_k$, $d$ and $B_k$, $b$ are the notch stress concentration factors in compression and bending resp.

$H_m$ is the average tool height $H$ is the height of the web $I_s$ is the free web length between the supporting points $a$ is the distance of the highest stressed point from the axis and $0.7 \leq c \leq 2$ For $c = 1$ the tensile stresses are completely compensated for by the compressive stresses.

This however does not always lead to an optimum tool efficiency. With respect to surface cracking e.g. a higher compressive stress than tensile stress can be of advantage ($c < 1$).

The invention and advantageous details of the invention are explained further in the accompanying schematic drawings of several forms of construction.

Figure 2:
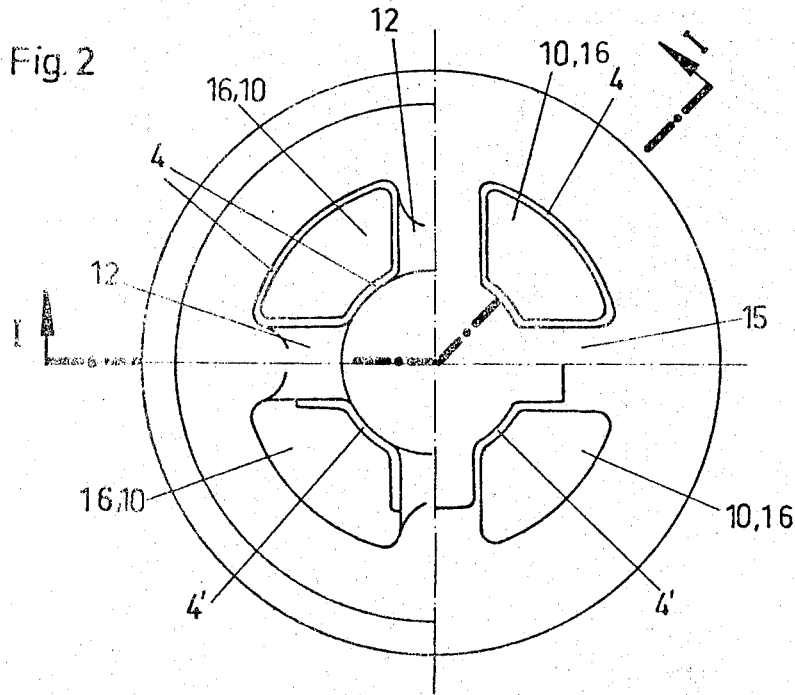

The drawings show:

FIG. 1 A cross sectional view through an extrusion tool in accordance with the invention, along the line I—I in FIG. 2.

FIG. 2 A cross sectional view along the line II—II in FIG. 1 whereby the lower half shows a modified from of construction.

Figure 3:
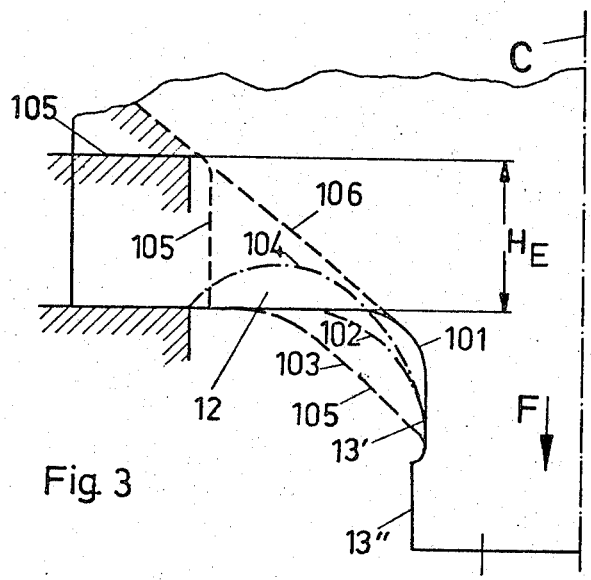

FIG. 3 A schematic drawing with several possible stress diminishing designs of the transition between web and mandrel neck of an extrusion tool core in accordance with the invention.

Figures 4, 5:
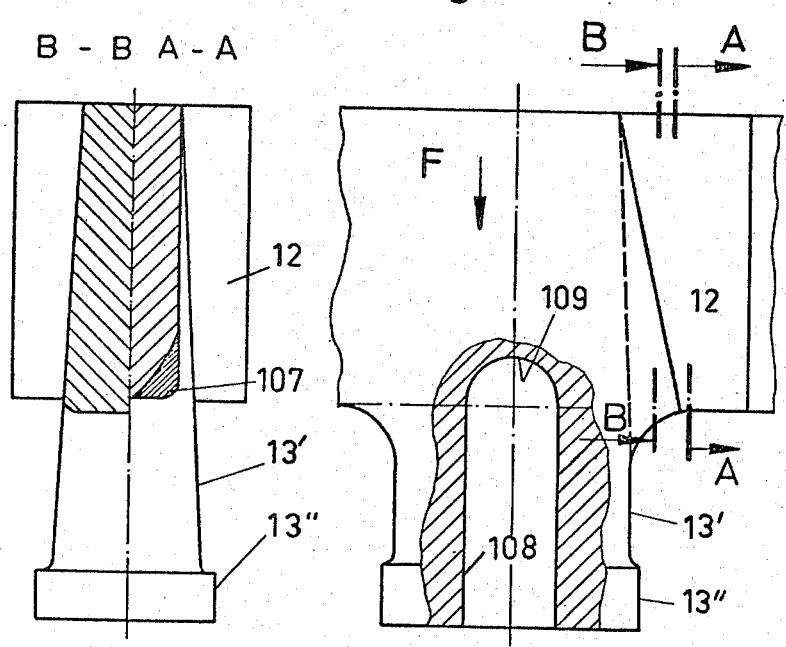

FIG. 4 in the left half, a cross section along the line B—B in FIG. 5; and in the right half a cross section along the line A—A in FIG. 5.

FIG. 5 a partly cut, partly broken, schematic drawing of a core designed in accordance with the invention.

The tool in accordance with FIGS. 1 and 2 comprises a die cap 1, a core 2 supported on an outer radially fitting collar 2' and a core shielding plate 3 likewise supported on an outer radially fitting collar 3 on the other side of the core 2. The core 2 and the core shielding plate 3 are centred by means of ring flanges 1' and 2'' which function jointly with the flange seats which the collars 2' and 3' surround.

The bearing surface to shape the outer contour of the hollow section shown on the inner periphery of the die cap by 1'' while the bearing for the inner contour is shown by 13'' on the head of the mandrel 13 of the core 2. Both bearings 1'' and 13'' are circular cylindrical surfaces in the exemplified embodiement shown. The bearings however can have other designs too and e.g. for the formation of rectangular cross sections, can be straight. The mandrel 13 counter to the direction of extrusion, which is shown by the arrow F, is reduced to form the mandrel neck which extends its other flat end into an opening in the core shielding plate 3. A stress relieving gap 5 is formed between the base of this opening and the flat end of the mandrel neck. This stress relieving gap 5 is sealed at the side at the area 14 of the core shielding plate the mandrel 13, by a flexible sealing step 4 which extends in the direction of the axis. As shown in the right half of FIG. 1 and in the upper half of FIG. 2 the flexible sealing step 4 forms the whole of the boundary of four ports 10 which are equally distributed around the periphery of the core 3, the ports being separated by webs 15. The lower half of FIG. 2 shows a modified version in which the sealing step 4 forms the inner edge and a part of the edge of the port 10 in the region of the web 15. The sealing step 4 then extends in a radial manner up to the inner radial rim of the die cap as can be seen in the left hand side of FIG. 1. The sealing step could only from the inner edge of the port 10. In that case of course a gap at the webs remains open through which a small quantity of the metal being extruded could force its way into the stress relieving gap.

The ports 10 in the core shielding plate are aligned in a radial manner with the ports 16 in the core 2, the ports 16 being approximately the same size as the ports 10, however extending rather further in. In the same way the webs 15 in the core shielding plate are aligned with the webs 12 in the core. In the example given the webs 15 are broader than the webs 12 by about double the thickness of the sealing step.

The tool comprising of the plates 1, 2 and 3 is held radially in a die ring 7 and axially between a downstream lying baking tool 6 and an upstream lying container 8 for the billet to be extruded.

In service the extrusion press exercises a compressive force on the metal billet 9, in the direction of the arrow F. The billet is, thereby, pressed through the ports 10 of the core shielding plate 3 then through the ports 16 of the core 2 and finally on to the bearings 1'' and 13'' to form a hollow section. The extrusion pressure acts on the surface of the region 14 presented to it and on the webs 15 on the core shielding plate and bends them in the extrusion direction F. The stress relieving gap 5 has sufficiently large dimensions that it permits the core shielding plate to bend freely without the region 14 of the core shielding plate coming into contact with the mandrel 13 of the core 2.

Therefore there is still only the tensile force on the mandrel 13 acting on the core 2 the tensile force consisting of the extrusion pressure multiplied by the annular ring surface which is limited inside by the mandrel neck 13' and outside by the cylindrical bearing surface 13'' at the head of the mandrel 13, as well as the frictional force arising from the flow of the extruded metal along the essentially axially oriented surfaces of the core. These forces are much smaller than the load taken up by the core shielding plate. The core 2, which would be under maximum stress as a result of a notch effect if the core shielding plate 3 were not used, above all on the downstream sided transition between the webs 12 and the mandrel neck 13', only has to bear a stress which is up to 70 percent lower than the stress created by omitting the core shielding plate. The total height of the extrusion tool consisting of the die cap 1, the core 2 and the core shielding plate 3 is just about the same as for a normal tool consisting of only a die cap and a core, because these ports must be designed to be correspondingly stronger since the loading is higher.

The tool shown in FIGS. 1 and 2 are particularly suitable for the production of hollow and semi hollow sections of large dimensions. Such sections can consist of all hot or cold extrudable materials. The extrusion tool is especially suitable for the manufacture of hollow and semi-hollow sections out of non ferrous metals in particular of aluminium alloys which are fairly difficult and difficult to extrude e.g. AlZnMg 1.

In FIG. 3 a section through several cores is shown in outline. The cores have various transitions 101, 102, 103, 104, and 106 between the web 12 and the neck 13' of the mandrel 13. The tool axis is denoted by C and the arrow F again indicates the direction of extrusion.

A normal core has a transition 101 (drawn with a full line) with a simple curvature between the web 12 which runs radially and the mandrel neck 13' which runs axially. The transitions 102 and 104 have a tractrix shaped contour with decreasing curvature towards the neck 13' of the mandrel. While the tractrix 102 forms a web 12 which is still partly radial, the tractrix 104 extends in the form of a large arch over the whole web length.

For production purposes it is simpler to manufacture a transition 103 whose contour consists of a simple slope 103 between the two curves on the mandrel neck and on the web.

For a design with contours 102 and 103 or 104 compared with a design with contour 101, the stress reduction at the transition between mandrel neck and web amounts to about 25 percent. With the transition 105 which initially runs like the contour 101 and then runs in an axial direction the supporting point of the core which e.g. can be formed on the die cap is displaced along the opposite direction to the extrusion direction F, by a length $H_E$.

A similar displacement is also provided in the case the transition 106 which after a curvature on the mandrel neck 13' runs complete by at a slope. On this occasion the displaced support surface is shaped sloping the same way as the transition. The use of the transitions 105 and 106 compared with the transition 101 allows a stress reduction of up to 50 percent to be achieved.

Further practical possibilities for decreasing the stress on the downstream side transition between the web 12 and the mandrel neck 13' are shown in FIGS. 4 and 5.

The stress at the transition can be reduced by strengthening the endangered zone by increasing the mandrel slope. In FIG. 5 the present normal mandrel slope is shown by a broken line and the improved mandrel slope is shown with a full line. The left half of FIG. 4 shows the optimum design of the mandrel slope in section BB through the zone which is most endangered. The right hand side of FIG. 4 is a section through a web at a position lying just outside the sloping part of the mandrel. The inner boundary of the field 107 shows the design normally used at present, the outer boundary shows the modified version also strengthened in this place.

In accordance with FIG. 5 a hole 108 is introduced into the mandrel head from its downstream end; the hole extends to about the level of the downstream end of the web 12 and exhibits a rounded off base 109. The surprising reduction in stress obtained by this is strongly dependent on geometrical factors.

By means of the described practical measures shown in the FIGS. 4 and 5 a reduction in stress, at the transition between web and mandrel neck, of the order of 25 percent can be achieved. The stresses appearing at the transition because of the notch effect can be traced every time without exception to tensile stresses. The magnitude of these tensile stresses can be reduced by the superposition of compressive stresses. It is conceivable that such superimposed compressive stresses can be applied by constructions incorporating ring shrinkage. At the high operating temperatures however creep cannot be avoided so that the superimposed shrinkage stresses would be quickly diminished. A better possibility for applying the shrinkage stresses consists of designing the outer contour of the core or the tool with a conical shape. The cone angle $2\alpha$ can be calculated from the formula given in the introduction. The cone angle opens out counter to the direction of extrusion.

Friction between the conical surfaces of the tool and its support should be avoided. This can be achieved by smearing with a graphite paste or better still with a $MoS_2$ preparation.

What is claimed is:

1. An extrusion tool having an extrusion direction, for use in the manufacture of hollow metal sections having inner and outer contours, comprising, in combination:

a die cap having a bottom surface with respect to said extrusion direction and a top surface and including a hollow chamber having inner bearing surfaces for forming the outer contour of said sections in said chamber, a core having a bottom surface and having at least one mandrel protruding into said chamber, core webs supporting said mandrel, said core abutting said die cap bottom surface and cooperating with said bearing surfaces for forming the inner contours of said sections, said core webs defining openings, and a core shielding plate abutting said core bottom surface and including at least one aperture defined therein communicating with said openings, said core shielding plate and said core defining a stress relieving gap therebetween in the region facing said mandrel, whereby the forces against said core shielding plate by metal being extruded are transmitted primarily through the region of said core around said gap so that forces transmitted from below said mandrel to said mandrel are minimized and said mandrel is less likely to be damaged during the extrusion.

2. The extrusion tool as claimed in claim 1, wherein said core shielding plate includes a sealing step portion projecting axially into said holes and overlapping part of said mandrel, whereby said stress relieving gap is sealed against penetration of said metal being extruded.

3. The extrusion tool as claimed in claim 1, wherein said core shielding plate includes a radially stepped outer collar operable for supporting said core and said core includes a ring flange operable for engaging and centering said outer collar.

4. The extrusion tool as claimed in claim 1, wherein said core shielding plate includes a plurality of plate webs defining a plurality of apertures equal to the number of said openings, each of said plate webs having a peripheral inner edge radially extending beyond said openings.

5. The extrusion tool as claimed in claim 1, wherein said mandrel includes a neck portion and the cross section of the transition from said core webs to said mandrel neck is a continuous curve including a central portion having a substantially infinite radius.

6. The extrusion tool as claimed in claim 5, wherein said curve is a tractrix having a radius increasing in the direction towards said mandrel neck.

7. The extrusion tool as claimed in claim 6, wherein said core webs include a sloping portion to join said curve, said sloping portion being another tractrix.

8. The extrusion tool as claimed in claim 1, wherein the transition from said core webs to said mandrel is axially tapered with an increasing cross section size in the direction of said mandrel.

9. The extrusion tool as claimed in claim 1, wherein said mandrel includes at least one stress relieving notch defined therein on its top surface.

10. The extrusion tool as claimed in claim 9, wherein said notch extends axially to about the level of the transition from said core webs to said mandrel.

11. The extrusion tool as claimed in claim 1, further comprising pressure means operable for applying radial pressure to said core during the manufacture of said sections.

12. The extrusion tool as claimed in claim 11, wherein said pressure means is a tool having an inner surface engaging the outer surface of said core, said tool and said core outer surface being conically decreasing in said extrusion direction and having a cone angle $2\alpha$ substantially defined by the relationship:

$$\tan 2\alpha = \frac{B_{K,d}}{B_{K,b}} \cdot \frac{Hm^2}{6 \cdot H} \cdot C \cdot \frac{I}{\left(\frac{Ls}{2} - a\right)\left(I - \frac{Ls - 2a}{2Ls}\right)}$$

wherein:
$Bk, d$ and $Bk, b$ are the notch stress concentration factors in compression and bending respectively
$Hm$ is the average tool height
$H$ is the height of the core web
$I_s$ is the free core web length between supporting parts
$a$ is the distance of the highest stressed point from the axis and $0.7 \leq C \leq 2$, the value of "C" being selected for a predetermined compensation of tensile stresses.

13. The extrusion tool as claimed in claim 12, further comprising a lubricant disposed on at least a portion of said conical surfaces.

14. The extrusion tool as claimed in claim 13, wherein said lubricant is graphite.

15. The extrusion tool as claimed in claim 13, wherein said lubricant is $MoS_2$.

* * * * *